United States Patent
Cook (10) Patent No.: US 8,820,060 B2
(45) Date of Patent: Sep. 2, 2014

(54) MOBILE DIESEL POWER SYSTEM WITH SEPARATED ENGINE AND EXHAUST

(76) Inventor: David Cook, Novi, MI (US)

( * ) Notice: Subject to any disclaimer, the term of this patent is extended or adjusted under 35 U.S.C. 154(b) by 447 days.

(21) Appl. No.: 12/884,162

(22) Filed: Sep. 16, 2010

(65) Prior Publication Data

US 2011/0067390 A1    Mar. 24, 2011

Related U.S. Application Data

(60) Provisional application No. 61/244,551, filed on Sep. 22, 2009.

(51) Int. Cl.
*F01N 3/02* (2006.01)

(52) U.S. Cl.
USPC .......................................................... 60/320

(58) Field of Classification Search
USPC ............... 60/320, 690; 165/122; 105/59, 231, 105/355, 357
See application file for complete search history.

(56) References Cited

U.S. PATENT DOCUMENTS

| | | |
|---|---|---|
| 4,342,921 A | 8/1982 | Williams |
| 4,382,189 A | 5/1983 | Wilson |
| 4,840,221 A * | 6/1989 | Dumas et al. ............... 165/41 |
| 5,887,567 A | 3/1999 | White et al. |
| 6,408,766 B1 | 6/2002 | McLaughlin et al. |
| 6,612,245 B2 | 9/2003 | Kumar |
| 6,612,246 B2 | 9/2003 | Kumar |
| 6,651,433 B1 | 11/2003 | George, Jr. |
| 6,912,848 B2 | 7/2005 | Bedapudi |
| 7,304,445 B2 | 12/2007 | Donnelly |
| 7,349,797 B2 | 3/2008 | Donnelly |
| 2010/0005775 A1 | 1/2010 | Kipping |

FOREIGN PATENT DOCUMENTS

JP          54065908 A  *  5/1979  ............. B61C 17/00

* cited by examiner

*Primary Examiner* — Kenneth Bomberg
*Assistant Examiner* — Jonathan Matthias
(74) *Attorney, Agent, or Firm* — Richards Patent Law P.C.

(57) ABSTRACT

According to the present disclosure, a train comprising one or more locomotives coupled to one or more tenders, which contain at least one of an exhaust after-treatment or a waste heat recovery system and optionally one or more other locomotive subsystems, such as dynamic braking, energy storage, driven wheels, and fuel storage, is provided. Accordingly, the present disclosure may have one or more of the following advantages: a tender to house an exhaust after-treatment system thereby easing space constraints on the locomotive power traction car. Additionally, said tender may include a large fuel tank, waste heat recovery system, and energy storage, thereby providing the means to substantially decrease fuel consumption or increase power, both with the option of switching to a different fuel source.

12 Claims, 9 Drawing Sheets

MOBILE DIESEL POWER SYSTEM WITH SEPARATED ENGINE AND EXHAUST

CROSS-REFERENCE TO RELATED APPLICATIONS

This application claims the benefit of U.S. Provisional Application No. 61/244,551, filed Sep. 22, 2009 which is incorporated herein by reference in its entirety.

BACKGROUND OF THE INVENTION

The present disclosure relates to locomotives, specifically the use of an equipped tender which serves to decrease fuel consumption or increase power and control emissions of one or two attached locomotives.

Impending circumstances will financially challenge the US railroad industry. Specifically, the continued reliance on high-cost diesel fuel and the implementation of stricter emission controls are conditions that the railroads and locomotive manufacturers are currently ill-equipped to manage with current system architecture.

Transportation by rail forms the basis for inter-city freight in the US, holding more than 40% of this market. One of the reasons for this is that rail transport is more fuel efficient and less expensive than other land-based sources of transport. The amount of freight being handled (measured in revenue ton-miles) continues to grow at a compounded annual growth rate of more than 5%.

Railroads are significant contributors to air pollution. According to the EPA, locomotives emit approximately 803,000 tons of NOx, 32,000 tons of particulate matter (PM), and contribute more than 2% of total transportation greenhouse gas emissions. In order to combat air pollution, the EPA promulgated a series of emission control standards, the first of which took effect in 2000. The goal of the standards was focused on greatly reducing NOx emissions along with smaller reductions for PM, CO, and unburned hydrocarbons. In addition to pollution concerns from NOx and PM, CO2 emissions are also coming under increased scrutiny.

The present invention relates to a waste heat recovery system for combustion engines and a method of controlling said waste heat recovery system.

The continued reliance on high-cost diesel hydrocarbon fuel and the implementation of increasingly strict emission controls have had, and will continue to have, a significant impact on our society. These impacts include an increase in the cost of transporting goods (which, in turn, leads to increases in retail prices, i.e., inflation), increased global tensions (as a large fraction of known oil reserves are located in tumultuous regions of the globe), and increased cost of power generating systems, including vehicles, (due to the need to add ever more complex, and costly, exhaust treatment systems).

These impacts have not gone unnoticed and a variety of inventions have been disclosed to address them. For instance, hybrid-electric vehicles are currently gaining in popularity due to the increased mileage they provide. This is achieved by adding a temporary energy storage device, e.g. a battery, to the vehicle and using this device to decouple power production from power consumption, allowing each to operate in its optimal regime.

Another area that has received some focus is the extraction of additional useful energy from the 'waste' energy streams discharged from internal combustion engines. Typically, between 55% and 75% of all the heat energy of the fuel consumed in an internal combustion energy is not converted into useful energy and is dissipated to the surrounding environment. Given the magnitude of the energy entrained in these waste heat streams, a means for extracting additional useful energy from internal combustion engines is needed.

BRIEF SUMMARY OF THE INVENTION

According to the present disclosure, a train comprising one or more locomotives coupled to one or more tenders, which contain at least one of an exhaust after-treatment, an engine cooling system, or a waste heat recovery system and optionally one or more other locomotive subsystems, such as dynamic braking, energy storage, driven wheels, and fuel storage, is provided.

Accordingly, the present disclosure may have one or more of the following advantages: a tender to house an exhaust after-treatment system thereby easing space constraints on the locomotive power traction car. Additionally, said tender may include a large fuel tank, waste heat recovery system, and energy storage, thereby providing the means to substantially decrease fuel consumption or increase power, both with the option of switching to a different fuel source.

In another embodiment, the present disclosure comprises a tender to house an engine cooling system thereby easing space constraints on the locomotive power traction car. Additionally, said tender may include a fuel tank, exhaust after-treatment system, and energy storage, thereby additionally providing the means to substantially decrease fuel consumption or increase power, both with the option of switching to a different fuel source.

In another embodiment, the present disclosure comprises a tender to house a waste heat recovery system thereby easing space constraints on the locomotive power traction car. Additionally, said tender may include a large fuel tank, exhaust after-treatment system, and energy storage, thereby additionally providing the means to substantially decrease fuel consumption or increase power, both with the option of switching to a different fuel source.

Migrating the railroad away from petroleum based fuels to compressed natural gas or dimethly ether (DME) not only helps reduce all emissions including CO2, but it also reduces the railroad industry's vulnerability to the volatility of the international petroleum market. One challenge for migrating to these fuels is the increased size of the fuel storage tanks. DME requires twice the volume as diesel fuel and CNG requires even more space. With a tender, the space for such tanks is available.

The railroad industry is very sensitive to locomotive fuel economy due to the large amount of fuel used by the industry as this cost represents the largest single operating expense for the railroads. Thus, methods which can improve performance by fractional percentages is looked upon favorably. As with most internal combustion engines, those on a locomotive expel up to 60% of the heat energy in the fuel burned as wasted heat. With the use of a waste heat recovery system, which is too physically large to fit within an existing locomotive but can be easily fitted within a tender, a fuel savings of 10% or greater is possible.

Another significant amount of energy is expelled from the locomotive when going down hill or coming to a stop due to the use of dynamic braking. This is a system in which the traction motors are used as generators. In prior dynamic braking systems, the energy of the train (potential energy when going down hill or kinetic energy when stopping) was converted into electricity which was used to heat resistive grids and dissipate the energy to the atmosphere. With a tender as described herein, there is ample space to provide a means of energy storage so that this energy is not simply lost.

Further advantages of this invention will become apparent from a consideration of the drawing and ensuing descriptions.

BRIEF DESCRIPTION OF THE DRAWINGS

The above, as well as other advantages of the present disclosure, will become readily apparent to those skilled in the art from the following detailed description, particularly when considered in the light of the drawings described below.

DETAILED DESCRIPTION OF THE INVENTION

To facilitate an understanding of the present disclosure, a number of terms and phrases are defined below:

Alternator: An electromechanical device used to convert mechanical power to alternating current electrical power. In the context of this disclosure, the term alternator can apply to actual alternators, generators, or any other electromechanical device typically used to convert mechanical power into electrical power.

Dimethyl ether (DME): DME is an organic compound with the formula CH3OCH3. The simplest ether, it is a colorless gas that is a useful precursor to other organic compounds and an aerosol propellant. It has similar storage characteristics as propane (LPG) except it is a liquid at lower pressures and therefore can use a thinner and lighter pressure vessel. Dimethyl ether is also promising as a clean-burning hydrocarbon fuel. DME is an especially promising fuel in diesel engines, owing to its high cetane number, 55, which is greater than that of diesel, typically 40-53. Only moderate modifications are needed to convert a diesel engine to burn DME. In contrast with the conversion to natural gas, which requires conversion to spark ignition (Otto) thermodynamic cycle, conversion to DME retains the engine's existing compression ignition thermodynamic cycle and its inherent 15% to 20% thermal efficiency gain. When combusted, the simplicity of this short carbon chain compound, and the oxygen atom it incorporates, leads to very low emissions of particulate matter, NOx, and CO. For these reasons, as well as being sulfur-free, dimethyl ether meets even the most stringent emission regulations in Europe (EURO5), U.S. (U.S. 2010), and Japan (2009 Japan). In some cases its use will facilitate meeting the most stringent emissions requirements with no additional exhaust after treatment hardware.

Dynamic braking: In the current art, locomotives employ two forms of braking—mechanical friction braking and dynamic braking. In modern locomotives, mechanical friction braking typically takes the form of air braking, which uses pressurized air to forcibly engage brake shoes with wheels and is typically employed on all cars in a train. With dynamic braking, the function of the traction motors is 'reversed'—they become generators. Up to this point, the energy generated has typically been dissipated as heat by using a series of highly resistive electrical coils.

Energy flow: Any contained and controlled movement of any type of energy, electrical, mechanical, and/or thermal.

Energy sink: Any device or mechanism that consumes or stores electrical energy.

Energy storage: Energy storage refers to any means for storing electrical power. Devices used for storing electrical power typically include batteries, capacitors, and/or flywheels.

Energy storage and dynamic braking: A system which includes dynamic braking and energy storage. Energy generated during braking is provided to the system direct current (DC) bus, from which it is stored in the energy storage device (s). Once the storage devices reach capacity, additional energy generated during braking is dissipated.

Exhaust After-Treatment (EAT): In the context of this disclosure, EAT refers to any device, or devices, and any required attendant consumables and a means for containing said consumables known in the art which are used to treat the exhaust stream of an ICE. Devices which comprise an EAT may include a Diesel Particulate Filter (DPF), which is used to remove particulate matter from the exhaust gases. Some DPFs include an additional sub system that injects a consumable fluid needed for system functioning. In some cases the consumable fluid is diesel fuel, but it could also be some other liquid or gas needed for the particular DPF system type to function properly. Devices which comprise an EAT may also include NOx Abatement Systems which are used to reduce the amount of 'nitrides of oxygen' in the exhaust gases. Several versions are known in the art including 'lean NOx traps' and 'selective catalytic reactors' (SCRs). Some devices require injection of a consumable fluid to function.

Fluid: Means any gas or liquid.

Heat Exchanger: Any device which transfers heat from one fluid to another, including devices such as radiator, heat exchangers, condensers, etc. An air-cooled heat exchanger is any heat exchanger wherein one of the fluids is ambient air.

Heated fluid stream: Any fluid, in motion, heated to approximately 60 C or greater. Heated fluid streams from a locomotive are any heated fluid streams whose temperature is increased by the operation of an ICE on-board a locomotive.

Internal combustion engine (ICE): A device that produces mechanical power by internally combusting a mixture of atmospheric air and fuel.

Locomotive: A railway vehicle that provides the motive power for a train. A locomotive is a wheel supported motive unit with an ICE coupled to an alternator, a power management and distribution system, and one or more traction motors. It may also include a waste heat recovery system, an exhaust after-treatment system, a fuel tank, a dynamic braking system, an energy storage system, and a fuel tank.

Locomotive waste product: Any energy produced by a locomotive which is not converted into useful work, typically heated fluid streams from the locomotive and dynamic braking energy.

Multiple cooling loops: Internal combustion engines can have multiple cooling loops depending on the engine application. One common application in large diesel engines is two loops, a High Return Temperature (HRT) loop and a Low Return Temperature (LRT) loop. Typically the primary purpose of the HRT loop is absorbing the waste heat from the coolant fluid circulating around the engine cylinder liners and through the cavities in the cylinder heads while maintaining a consistently high temperature in the cylinder liners and the cylinder head. The common term for this part of the coolant loop that cools the cylinder liners and cylinder heads is the jacket water circuit. The high consistent temperature is desirable in this area to reduce how much heat is absorbed from the combustion gases as they are driving the piston down and then driving the turbo supercharger. The lower the temperature of the surfaces surrounding the combustion gases, the higher the heat transfer rate and the lower the efficiency of the combustion process. For this reason it is desirable that the HRT loop be designed to operate with a lower temperature drop and a higher flow rate. The difference between the engine HRT coolant exit temperature and the return fluid temperature can be as low as 8 C, at high loads there could be a 98 C exit temperature and a 90 C degree return temperature. On the other hand, the LRT loop has the purpose of lowering the temperature of the compressed charge air as much as possible. For increased fuel efficiency and reduced exhaust emissions, newer engines run higher boost levels and desire very low air temperatures as the charge air enters the intake manifold. Compressor exit temperatures may reach 240 C, and desired Intake air temperature may be 35 C. Therefore the coolant absorbing the heat may still reach a temperature approaching its boiling point at 105 C, but it is desirable for it to enter the charge air cooler at as low a temperature as possible, below 35 C preferred. Due to the low desired Intake air temperature, it is common to use both a liquid cooled first stage cooler and an air cooled second stage cooler to further reduce the charge air temperature down to the desired temperature.

Natural gas: As used herein, natural gas refers to natural gas, liquefied petroleum gas (LPG), and other such similar fuels.

Power management and distribution (PMAD): A system, primarily electrical in nature, which provides the primary control of the electricity generated on-board a locomotive. The primary functions of the PMAD are converting alternating current (AC) power to direct current (DC) power and converting DC power to AC power. Within the PMAD, the AC power is converted to DC power at a controlled voltage and output to the DC bus, which is comprised of a plurality of electrical conductors. Multiple devices can extract power from and/or provide power to the DC bus, including ICEs, batteries, and other power sources. By operating at a common DC voltage, a DC bus can be shared among one or more locomotives and one or more tenders.

Tender: A railcar used in various ways to support a locomotive. The term 'tender' in this disclosure will refer to a wheel mounted railcar that is carrying 'tender components' and/or consumable supplies used to assist one or two attached locomotives. The tender will typically be connected to a common DC bus with the assisted locomotive(s). The wheels of a tender in this application may be passive or may be equipped with traction motors. Wheels equipped with traction motors may be used to provide tractive effort that will assist in accelerating or decelerating the train.

Tender components: Tender components are those systems which may be located in a tender car. Tender components include, but are not limited to, WHRS, EAT, dynamic braking system and energy storage system, fuel tank, traction motor, and other locomotive subsystems.

Traction motor: A traction motor is an electric motor which converts electric power into mechanical energy at the wheels, which provide the motive force to move a locomotive and propel an attached train. For the purposes of this disclosure, the term 'traction motor' also includes the traction motor controller, a primarily electrical circuit which controls the actual motor itself.

Train: A train is a grouping of zero or more rail cars connected together with at least one locomotive unit. Optionally, a train may have more than one locomotive and one or more tenders.

Waste heat recovery system (WHRS): Between 55% and 75% of all the heat energy of the fuel consumed in an internal combustion engine is not converted to mechanical energy and is typically dissipated to the surrounding environment. Systems which capture this wasted heat energy and convert some portion of it to useful energy are well known in the art and are referred to as 'waste heat recovery systems'. In the context of this disclosure, a WHRS is one which accepts one or more heated fluid streams from an ICE and a cooling media, typically ambient air, as its primary inputs and provides electrical, typically DC, power as its output. The WHRS system may also replace the traditional ICE cooling system if one of the heated fluid streams is an engine coolant stream. The DC power provided by the WHRS can be used to improve fuel economy, as the engine can be run at a lower power setting while providing the same amount of power to the traction motors; or to increase tractive effort, as additional power can be provided to the traction motors; or some combination of the above.

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical. In addition, while much of the present disclosure is illustrated using application to diesel electric locomotives examples, the present disclosure is not limited to these preferred embodiments.

The modern diesel electric locomotive is a small power plant (typically 1-5 MW) on wheels. As large as they are, they are severely space constrained due to all of the equipment needed. The impending arrival in 2015 of the Tier 4 emission standards will require a significant change in locomotive architecture as equipment based on technology being developed for on-road truck diesel engines and stationary large diesel engines will not fit within the confines of the locomotive. The equipment required to meet compliance—urea storage tank, diesel oxidation catalyst, diesel particulate filter, and selective catalytic reactor—will take up a volume of approximately 7 cubic meters for a 4400 hp locomotive. This would have to be fit into a locomotive package that is currently challenged to find space for necessary cooling system upgrades to meet current tier 2 and upcoming tier 3 emissions standards.

One obvious approach to solving this problem is simply to make the locomotive larger. However, this poses a severe challenge. There is a size-based envelope for the locomotive that is externally set by many factors including: bridge and tunnel sizes, production facility limitations, railroad service buildings, and the radius of curvature of the existing railroad tracks.

The current disclosure teaches a different approach—the use of a tender in which one or more of a locomotive's subsystems can be located. This approach provides the additional necessary packaging volume for the EAT components without violating the established locomotive size envelope. In addition, with the extra package volume made available, additional equipment can be provided to further improve efficiency and reduce emissions. While the prior art does include the use of tenders, previous inventions have not added enough value to the railroad operation to promote the significant locomotive architecture and operational procedure changes that would be necessary to justify the tenders implementation.

The present disclosure addresses short-comings in the current art. Since a means for capturing and storing typically wasted energy in a tender car is provided, there is a significant cost reduction due to using this system. This is a significant savings as fuel is a large expense for the railroad industry. A tank located on a tender allows for significantly more fuel storage on the train. This extra fuel storage volume allows the use of an alternative fuel such as DME. DME as a replacement for petroleum based fuels has several inherent advantages for the locomotive industry. It can be locally sourced from either coal or Biomass having positive effects on national energy security, local jobs, and the environment. National energy security benefits come from the reduced dependence on foreign sources of petroleum and the attendant volatile costs. Local economic impact comes from the reduced importing of and therefore the local jobs in the production of DME from several sources. A likely scenario for the transition to DME as an alternative fuel is using coal as the primary feedstock for producing DME before changing over to biomass as that technology and infrastructure becomes mature. The US has an abundance of unused coal, and the railroad industry is a significant part of the infrastructure for it. Trains transport 70% of US coal and coal makes up 40% of the railroad freight volume. With the increased efficiencies due to fueling with DME and modern carbon capture and storage (CSS) used while making it from coal, the carbon footprint of DME could be less than that of petroleum based fuels when transporting and refining is also taken into account. When DME is made from biomass, it will essentially be a carbon neutral fuel. DME could also be made utilizing off peak excess electrical power from existing large power plants or future remotely located wind farms. This locally sourced fuel will eventually be cheaper than petroleum based fuels as the world energy supplies continue to tighten due to increased demand and reduced supply as the worlds oil reserves are used up.

Further cost reductions attributable to DME could be the elimination of part or all of an EAT because of the extremely clean burning nature of DME combustion. This has the benefit of reducing the purchase and maintenance cost of after treatment, along with the efficiency loss due to the EAT back pressure and need for raw fuel dosing at low power settings. A current DPF system will lower efficiency approximately 2% due to the need to regenerate the DPF at low operating temperatures. These regeneration events thermally cycle the DPF unit and after a certain number of thermal cycles the units will need to be replaced. The railroad industry practice of long idle times will increase the need for regeneration of the filters and shorten their life. Replacement units could cost as much as $35,000, not to mention the down time and maintenance.

This clean burning nature of DME can also increase service intervals on locomotives as there will be significantly less particulate matter contamination of the ICE's oiling system. Engine oil in an ICE has a service life limited by the amount of soot that can be contained in the lubrication oil before its ability to lubricate the moving parts of the ICE. Because DME burns almost soot free the service life of the oil can be greatly extended or the amount of engine oil consumed can be reduced, thus saving the cost of buying it.

The additional power harnessed by the WHRS located within the tender can also reduce costs by eliminating the need for one of the locomotive units in a multiple locomotive train. It can do this by transferring power to the traction motors of the coupled locomotive, or by driving its own traction motor, if so equipped. Even higher power outputs could come from utilizing the freed up space on the locomotive for more ICE engine power. It has been reported that locomotive manufacturers are having ongoing reliability problems with locomotives in excess of 4400 hp due to packaging constraints on the cooling systems as they try to meet current tier 2 and 3 emissions control regulations.

The implementation of a WHRS on the tender that extracts jacket water heat energy will effectively relocate the engine cooling system to the tender car. Typical locomotive cooling systems are mounted on the roof of the locomotive and are force fed ambient air by fans that are either electrically powered or mechanically driven by the ICE. On older pre-emissions locomotives these fans drew up to 150 hp on a 4400 hp locomotive, this is equivalent to a 3.5% reduction in fuel efficiency. Modern locomotives are going to need cooled EGR to meet reduced NOX emissions requirements for Tier 4, this will greatly increase the overall cooling load on the jacket water system. A reasonable EGR flow rate of 15% can increase the jacket water cooling load 40%. This increased cooling load will require even more cooling system space and fan energy to move the needed amount of cooling air through the increasingly dense cooling package. Current plans to achieve low NOX levels without using an SCR will push EGR rates well in excess of 15% and may hit 50% at which point the new cooling load will be more than double that of the pre emissions engines. The fans for this cooling load could impact BSFC even more than the 3.5% of the older systems.

Once the cooling load has been moved to the tender, there is room to orient the large air cooled heat exchangers which cool the WHRS or the ICE in such a way that they can use ram air when the locomotive is moving. Using ram air, as opposed to powered fans, could result in a 3-5% BSFC reduction.

Figure 1:
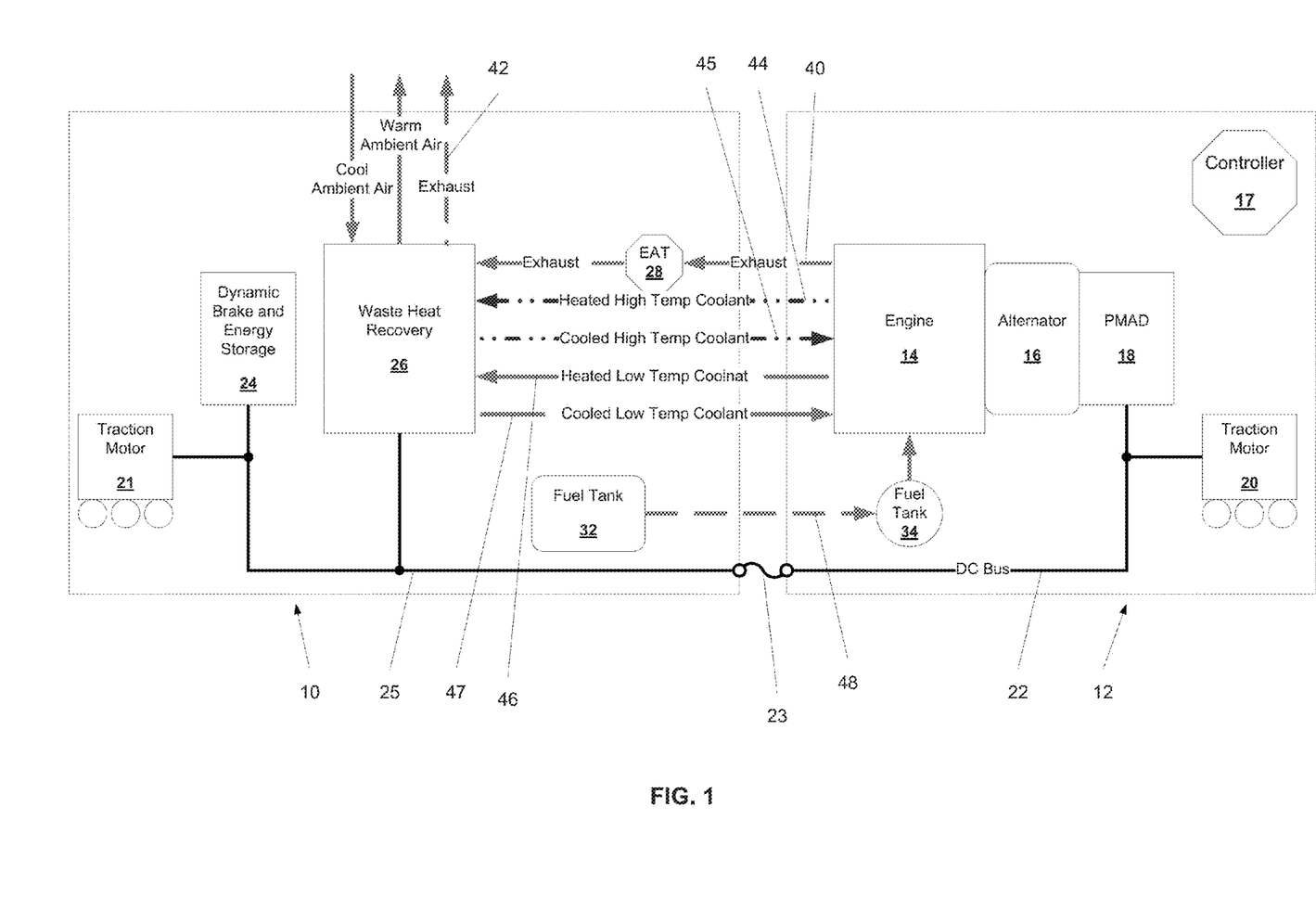
FIG. 1 illustrates a train with one locomotive and a tender including a waste heat recovery system; an exhaust after-treatment system; a fuel tank; dynamic braking and energy storage system; and a traction motor.

FIG. 1 depicts an embodiment of a train comprising one locomotive 12 connected to one tender 10 with heat transfer fluid flows and electrical connections illustrated.

The locomotive 12 comprises an ICE 14 which is mechanically connected to an alternator 16. The alternator 16 is connected to a PMAD 18 which is electrically connected to a common DC bus 22. The DC bus 22 is connected as a common circuit to at least one traction motor 21. The DC bus 22 may be also electrically connected to a standard dynamic braking resistive grid power module (not shown).

The tender 10 comprises an EAT 28 and/or a WHRS 26, which is electrically connected to a DC bus 25. The tender 10 may optionally include an electrical energy storage system 24, zero or more traction motors 21, a fuel tank 32 and/or other locomotive systems components which are typically found in existing locomotives. If present, the energy storage system 24, and zero or more traction motors 20 are electrically connected to the DC bus 25.

Exhaust gases from the ICE 14 flow through a flexible exhaust conduit 40 to the EAT 28. After passing through the EAT 28, the exhaust gases flow to the WHRS 26. The exhaust gases then flow through the WHRS 26 and are released to the atmosphere via an exhaust gas exit 42. When the EAT 28 is not present, the exhaust gases from the ICE 14 flow through the flexible exhaust conduit 40 directly to the WHRS 26.

As is standard locomotive practice, the ICE 14 has two fluid coolant systems—a High Return Temperature (HRT) loop coolant system and a Low Return Temperature (LRT) loop fluid coolant system. The fluid in the coolant systems may be the actual cooling fluid itself or an intermediary fluid. In an alternative embodiment, an ICE 14 may have a different number of coolant systems.

Heated HRT coolant carries heat energy from the ICE 14 to the WHRS 26 through a HRT coolant feed 44. After flowing through the WHRS 26 and transferring an amount of heat energy, the fluid returns at a lower temperature to the ICE 14 through a HRT coolant return 45. This forms a continuous closed loop for the HRT coolant fluid consisting of the ICE 14, the feed 44, the WHRS 26 and the return 45.

Heated LRT coolant carries heat energy from the ICE 14 to the WHRS 26 through a LRT coolant feed 46. After flowing through the WHRS 26 and transferring an amount of heat energy, the fluid returns at a lower temperature to the ICE 14 through a LRT coolant return 47. This forms a continuous closed loop for the LRT coolant fluid consisting of the ICE 14, the feed 46, the WHRS 26 and the return 47.

The locomotive 12 has an onboard fuel tank 34 that provides the ICE 14 with fuel. The tender 10 optionally includes a fuel tank 32. If the fuel stored in fuel tank 32 is of the same type of fuel stored in the tank 34, the fuel tanks may be joined by a flexible fuel transfer line 48. If the fuel stored in fuel tank 32 is different from the type of fuel stored in the tank 34, flexible fuel transfer line 48 joins fuel tank 32 to the ICE 14 without first connecting with fuel tank 34.

The DC bus 25 located in the tender 10 is electrically connected to the DC bus 22 in the locomotive 12 through a flexible DC bus connection cable 23. The locomotive controller 17 may include a means for detecting the presence of the DC bus 25. Said means can be embodied with a mechanical interlock, an electrical signal, or other means known in the current art. The operating mode of the locomotive 12 may be restricted if the DC bus 25 is not present.

It is understood that equipment located in the tender 10 is absent from the locomotive 12, except as noted above. For example, should certain components of the EAT 28 be housed within the tender 10, then these components of the EAT 28 are not housed within the locomotive 12. In certain cases, such as very large SCR units, a component may be comprised of multiple modules. In such cases, it is understood that modules located in tender 10 are absent from locomotive 12, except as noted above.

Figure 2:
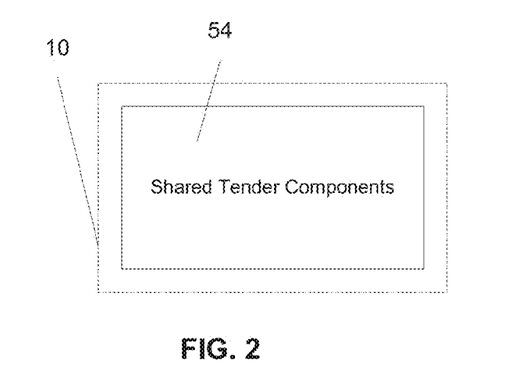
FIGS. 2, 3, and 4 illustrate three configurations of tender equipment within the tender.
Figure 3:
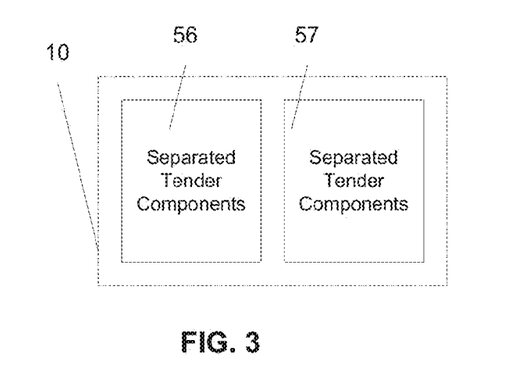
Figure 4:
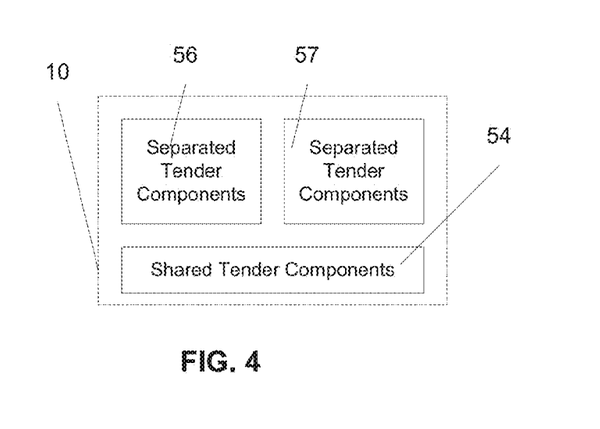

FIGS. 2, 3 and 4 illustrate three embodiments of the tender 10 and the manner in which tender components are provided for use by either one or two locomotives 12.

FIG. 2 illustrates a shared configuration of an assembly of shared tender components 54. In this embodiment, the tender 10 has one assembly of shared tender components 54. When the tender 10 is coupled to one locomotive, the assembly of shared tender components 54 is used by the one locomotive. When the tender 10 is coupled to two locomotives, the assembly of shared tender components 54 is used by both locomotives.

FIG. 3 illustrates a separated configuration of two assemblies of separated tender components 56 and 57. In this embodiment, the tender 10 has two assemblies of separated tender components 56 and 57. When the tender 10 is coupled to one locomotive, one of the assemblies of separated tender components 56 or 57 is used by the one locomotive. When the tender 10 is coupled to two locomotives, one of the assemblies of separated tender components 56 or 57 is used by the one locomotive and the other assembly of separated tender components 56 or 57 is used by the other locomotive.

FIG. 4 illustrates a split configuration of the assembly of shared tender components 54 and the two assemblies of separated tender components 56 and 57. In this embodiment, the tender 10 has one assembly of the shared tender components 54 and two assemblies of the separated tender components 56 and 57. When the tender 10 is coupled to one locomotive, the assembly of shared tender components 54 and one of the assemblies of separated tender components 56 or 57 are used by the one locomotive. When the tender 10 is coupled to two locomotives, the assembly of shared tender components 54 is used by both locomotives, one of the assemblies of separated tender components 56 or 57 is used by the one locomotive and the other assembly of separated tender components 56 or 57 is used by the other locomotive.

The embodiments shown in FIGS. 2, 3 and 4 represent a compromise between cost, complexity, and reliability. Because there is only one assembly of the shared tender components 54 in FIG. 2 that are connected to two locomotives, this would be the lowest cost option. It could also have a slightly higher efficiency because the larger parts can be more efficient. Larger heat exchangers in the WHRS 26 would have more heat transfer area in relation to the outer surface where heat energy is lost. The internal heat transfer area goes up as a cubed function where the outer surface area goes up as the square. The combined piping of the system would also have a similar effect of flow area increased as the square of area while the circumference of the pipes where the heat would be lost increases linearly with diameter. Combined piping also means less length of pipe, further reducing heat loss area. Turbine efficiency also goes up with size. Larger turbines have less loss at the same internal clearances and can be designed with more economical lower speed turbomachinery. The simplicity of the single shared system would also save money by having fewer components to maintain or replace. These benefits come at the cost of redundancy, if any one part of the shared system fails, both locomotives could be shut down and would leave the train with greatly reduced or no power.

FIG. 3 with independent assemblies of separated tender components 56 and 57 would initially cost more than the system of FIG. 2, but would have the advantage of only shutting down one locomotive if a part fails in one of the systems. This would leave the train with at least half power after a single component failure. This system would also pay a slight efficiency loss and higher maintenance costs.

FIG. 4 is a compromise between FIG. 2 and FIG. 3. Independent systems would typically be maintained for components that have a higher potential for failure, such as the WHRS 26, and the assembly of shared tender components 54 would typically contain components with a low likelihood of failure, such as a fuel tank 32 or the simple components of the EAT 28.

Figure 5:
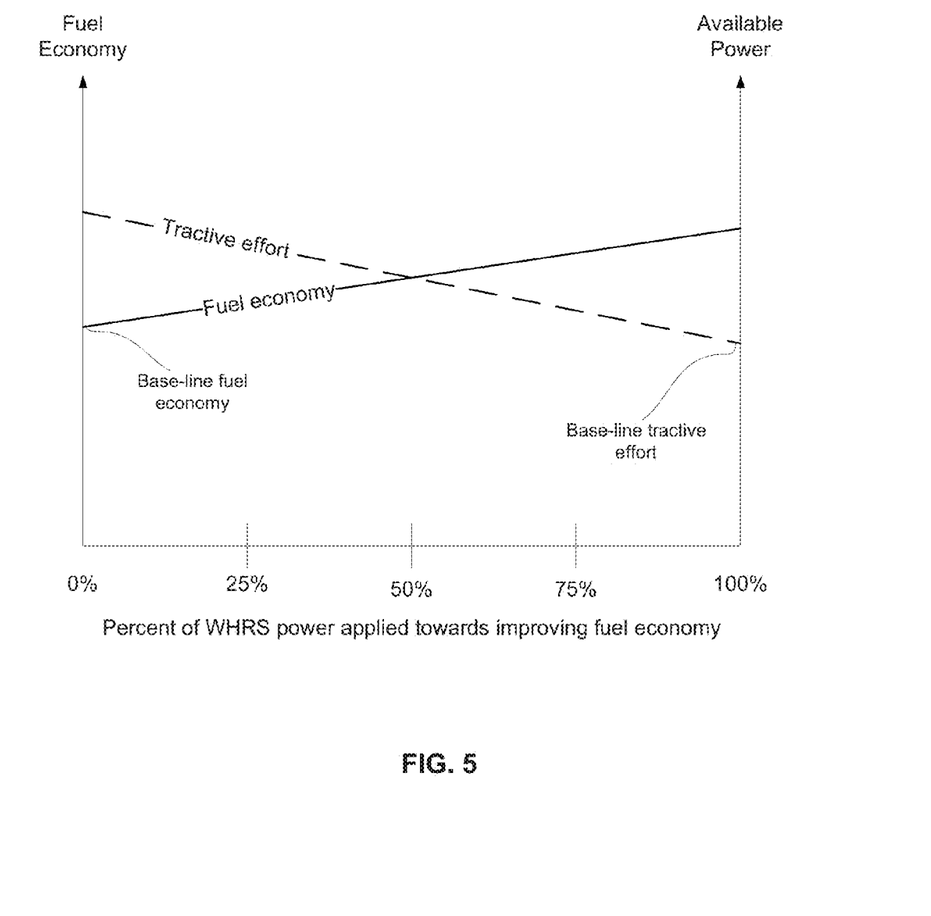
FIG. 5 illustrates how power generated from a waste heat recovery system can be applied to improve fuel economy and/or improve tractive effort.

The graph in FIG. 5 shows how the DC power generated by the WHRS 26 can be used to improve fuel economy, improve tractive effort, or both. The manner in which this power is used is determined by operator input and the locomotive controller 17.

As the WHRS 26 generates electrical power in response to available waste heat, it will reduce the fueling rate and corresponding fuel consumption when tractive effort commanded by the operator remains the same. If maximum tractive effort is commanded by the operator, then the fueling rate will remain the same, but the tractive effort at the wheels will increase over time due to the increased amount of electrical power now available on the DC Bus 22 as the WHRS 26 converts the heat to electrical power.

Figure 6:
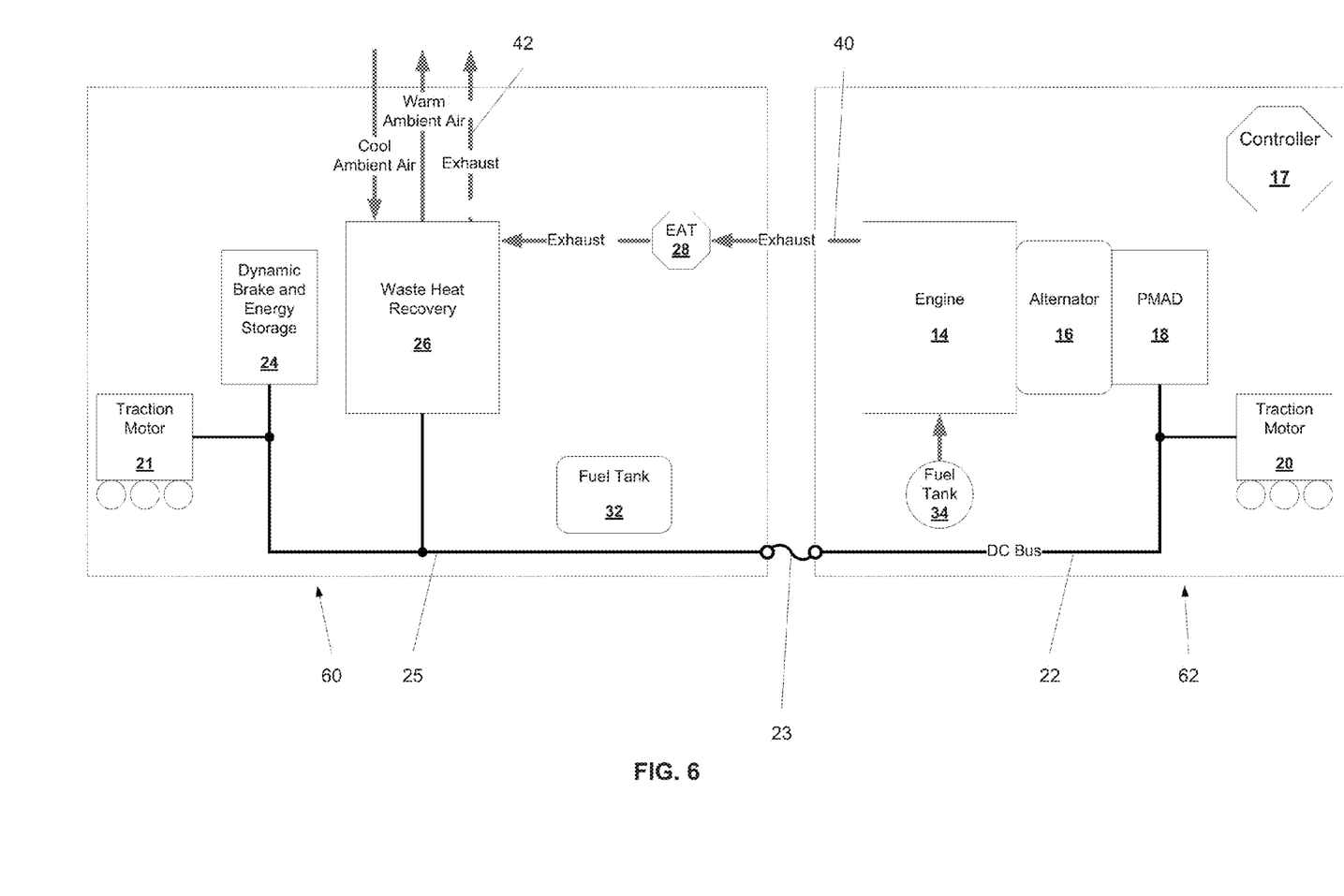
FIG. 6 illustrates a diesel-powered train with one locomotive and a tender in which an exhaust after-treatment system is located in said tender.

FIG. 6 illustrates another embodiment of a train with a locomotive 62 connected to a tender 60. Exhaust gases carrying waste heat energy are transported from the ICE 14 on the locomotive 62 though a flexible exhaust conduit 40 to the EAT 28, which is mounted in the tender 60. The tender 60 optionally includes a WHRS 26, an electrical energy storage system 24, and zero or more traction motors 21. If the WHRS 26, electrical energy storage system 24, and/or zero or more traction motors 20 are present, then a DC bus 25 is also present and the optional components are electrically connected to the DC bus 25. If the DC bus 25 is provided, the flexible DC bus connection cable 23 is provided to electrically connect the tender DC bus 25 to the locomotive DC bus 22.

Tender 60 optionally contains a fuel tank 32, which contain the same fuel or different fuel as that stored in locomotive-mounted fuel tank 34. If the fuels are the same, said optional tender-mounted fuel tank 32 may be connected to locomotive-mounted fuel tank 34 via a flexible conduit. If the fuels are different, said optional fuel tank is connected to the ICE fuel intake system without first connecting to locomotive-mounted fuel tank 34.

The locomotive controller 17 may include a means for detecting the presence of the tender 60. Said means can be embodied with a mechanical interlock, an electrical signal, or other means known in the current art. The operating mode of the locomotive 62 may be restricted if the tender 60 is not present.

The apparatus embodied in FIG. 6 provides enhanced emissions compliance, such as that required by EPA Tier 4, and optionally a means for improving fuel economy by extracting additional energy from "waste heat", via a waste heat recovery system, while making minimal modifications to currently produced locomotives. The locomotive 62 includes an existing engine cooling system and on-board fuel, typically diesel, storage. This disclosure is enabled with the addition of the flexible exhaust conduit 40 to transfer the exhaust gases to the tender 60. In those embodiments with the optional WHRS 26, the other necessary modification to the locomotive 62 is the addition of the flexible DC bus connection cable 23 to transfer the power generated by the WHRS 26 to the locomotive DC bus 22.

A benefit of the apparatus embodied in FIG. 6 is providing a near-term, low-cost transitional configuration of a diesel fuel burning locomotive 62 to achieve Tier 4 emissions compliance and optionally increase fuel efficiency and available power with minimal engineering changes to current locomotive architecture. As in other embodiments disclosed, the tender car 60 may have passive wheels or wheels with traction motors 21 that provide additional tractive effort to the train.

Figure 7:
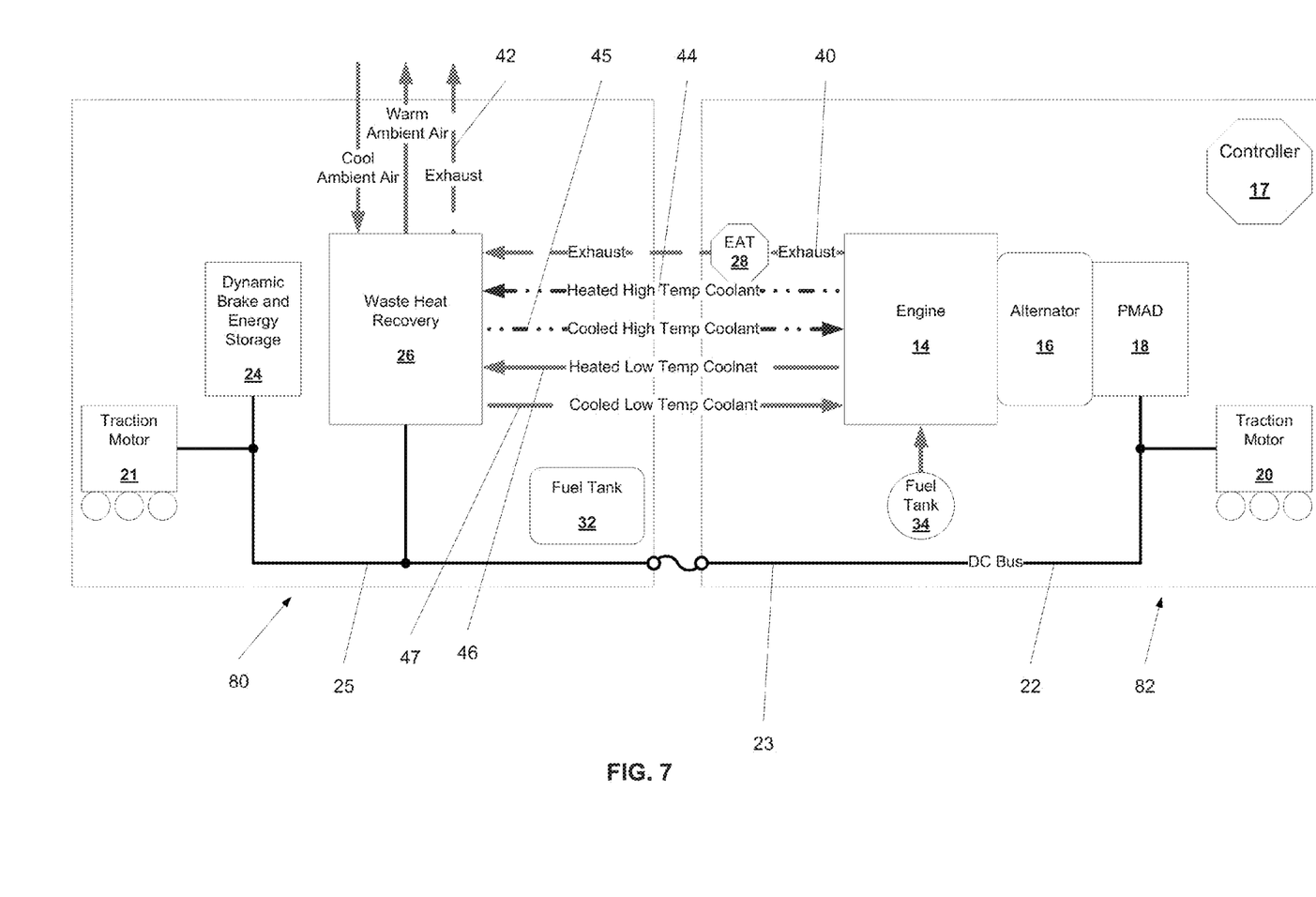
FIG. 7 illustrates a diesel-powered train with one locomotive and a tender in which a waste heat recovery system is located in said tender.

FIG. 7 illustrates another embodiment of a train with a locomotive 82 connected to a tender 80. Exhaust gases carrying waste heat energy are transported from the ICE 14 on the locomotive 82 to the EAT 28 also mounted in the locomotive 82. The cleaned exhaust gases are then carried to the WHRS 26 mounted in the tender 80 via the flexible exhaust conduit 40. The tender 80 optionally includes an electrical energy storage system 24 and zero or more traction motors 21. The WHRS 26, and optionally electrical energy storage system 24, and/or zero or more traction motors 20 are electrically connected to the DC bus 25. The flexible DC bus connection cable 23 is provided to electrically connect the tender DC bus 25 to the locomotive DC bus 22.

Tender 80 optionally contains a tender-mounted fuel tank 32, which contain the same fuel or different fuel as that stored in locomotive-mounted fuel tank 34. If the fuels are the same, said optional tender-mounted fuel tank 32 may be connected to the locomotive-mounted fuel tank 34 via a flexible conduit. If the fuels are different, said optional fuel tank is connected to the ICE fuel intake system without first connecting to the locomotive-mounted fuel tank 34.

A benefit of the apparatus embodied in FIG. 7 is maximizing the performance of the EAT 28, which is desirable for locomotives which consume diesel fuel. With this configuration, the standard locomotive mounted ICE engine cooling system is functionally replaced by the tender-mounted WHRS 26, thereby freeing up considerable space within the locomotive 82. This space can be used to install the EAT 28, which is now mounted as close as physically possible to the exhaust outlet of the ICE 14. This placement minimizes temperature loss of the exhaust gases, especially in those cases when the engine is running at low power levels. At low engine power levels, the temperature of the gases leaving the engine are lower and since there is less exhaust mass, the gases spend more time being transported to the EAT 28, providing additional opportunity for further heat loss and corresponding temperature drop of the exhaust gases. Since the EAT 28 loses efficiency with lower exhaust gas temperatures, minimizing temperature losses is critical. By mounting the EAT 28 in the locomotive 82, the use of additional fuel and/or other consumables used to keep maintain the EAT 28 efficiency is minimized.

A tender-mounted fuel tank 32 may contain the same or different fuel as stored in a locomotive-mounted fuel tank 34. In the case where the fuel is the same, the tank provides additional fuel storage capacity. Given the larger available tank volume, this enables the use of alternative fuels, such as DME or natural gas. In the case where the fuel is different, the tanks provides the means for enabling duel fuel combustion cycles, which have been shown to be particularly effective at reducing greenhouse gas emissions.

Figure 8:
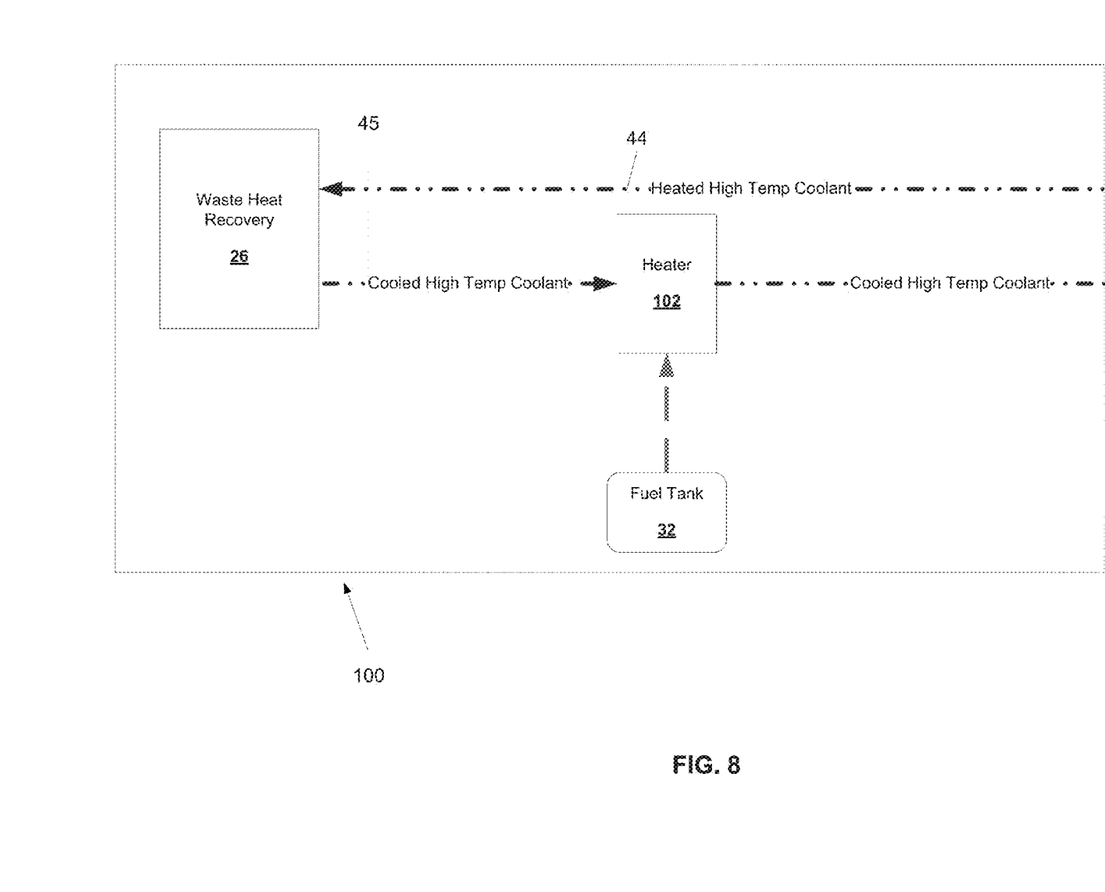
FIG. 8 illustrates the addition of a coolant heater to a tender.

In the cases of the embodiments shown in FIGS. 1 and 6, specifically, those embodiments which comprise a tender-mounted WHRS 26 which accepts one or more engine cooling loops, the presence of a tender-mounted fuel tank 32 does provide an unexpected benefit. Large diesel engines, especially those which do not use antifreeze protection in their cooling systems, are typically left idling in cold conditions to prevent engine damage. Idling consumes a significant amount of fuel and produces a significant amount of greenhouse gases. FIG. 8 illustrates a means to address this problem.

FIG. 8 illustrates a simplified view of a tender 100. Included is a waste heat recovery system 26, a fuel tank 32, a heater 102, and a means for electrical power storage (not shown). When the ICE is operating heated HRT coolant carries heat energy from the locomotive-mounted ICE to the WHRS 26 through a HRT coolant feed 44. After flowing through the WHRS 26 and transferring an amount of heat energy, the fluid returns at a lower temperature to the locomotive-mounted ICE through a HRT coolant return 45. When heater 102 is in use it will get fuel from the tender-mounted fuel tank 32 adding heat to the HRT coolant that is flowing in the same flow loop as when the ICE is operating. Instead of carrying heat energy away from the ICE to the WHRS where heat energy is extracted, heater 102 is now adding heat to the HRT coolant to maintain a specified minimum temperature in the fluid or of the ICE components Heater 102 provides the means for completely shutting down the locomotive-mounted ICE without risk of cold damage to the engine system. If the WHRS 26 does not have a built in HRT circulation pump or the appropriate HRT coolant temperature sensor, then these could be included in heater 102. When the temperature of the HRT coolant falls below some prescribed value, the heating means inside of heater 102 is activated and the HRT coolant circulation pump. Since the primary function of the heater is to heat the HRT coolant and not the engine, the amount of fuel it consumes and the greenhouse gases emitted, are significantly lower than constantly or intermittently idling the locomotive-mounted ICE to heat the HRT coolant by first heating up the ICE. This also eliminates a considerable amount of wear on the ICE that would be caused by continuous running at idle or frequent start-ups. As anti-idling and emissions regulations come into effect, locomotives will be newly built or retrofitted to eliminate continuous ICE idling. ICE idling time will be minimized by automatically starting up, running briefly and shutting down in order to maintain the HRT coolant in the circuit at a specified minimum temperature. This frequent start up and operation while the engine is cold will cause significant engine wear equivalent to a much greater time operating when the engine is warm. This is also a significant life issue on engine after-treatment devices as idling engines generate significantly more soot and do not expel exhaust gasses with a high enough temperature to operate the DFP properly. This will require more frequent DPF active regeneration cycles where the engine has to be run at a high speed and fuel is injected into the exhaust gasses to regenerate the DPF at high temperature. This has several negative effects, the cost of more fuel being consumed, the added green house gasses, and the thermal cycling of the after treatment system components. Current after-treatment systems can only be thermally cycled so many times before they become unusable and need to be replaced.

In addition to the embodiment described, the heat generating part of heater 102 could also be electrically powered instead of combusting fuel.

Figure 09:
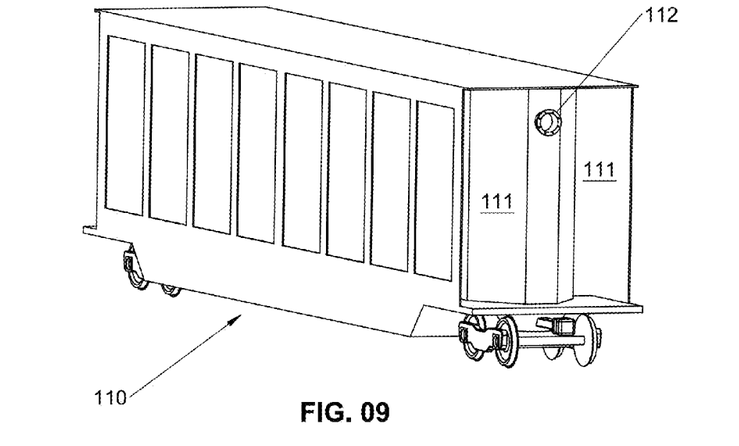
FIG. 9 is an isometric view of a tender car illustrating an exhaust gas coupling and the atmospheric air inlets for a heat exchanger.

FIG. 9 illustrates an isometric view of a tender 110 that would include ram air cooling of the air cooled heat exchangers. Visible on the end of the tender 110 is the entrance to the cooling air flow path 111 on each side of the tender. To illustrate how large these flow path areas are, they can be compared in size to the optional exhaust gas inlet port 112 which is an inside diameter of approximately 14 inches.

Figure 10:
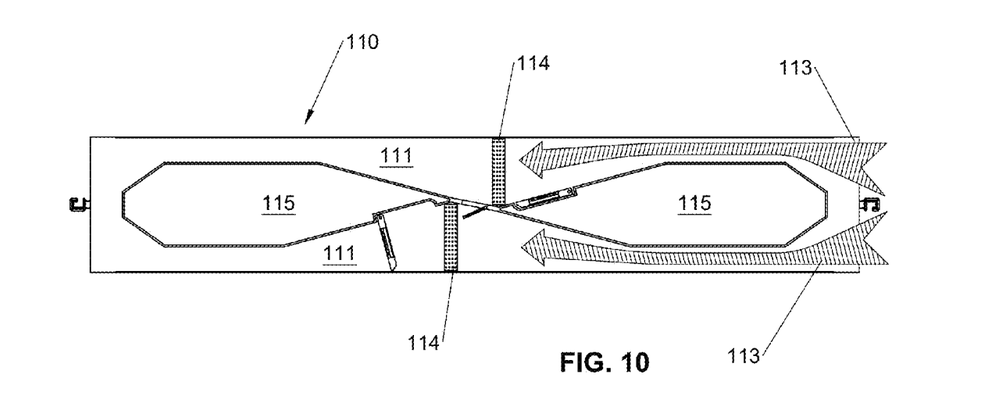
FIG. 10 is a section view of the tender looking down on the tender. This view illustrates the air flow pattern up to the air cooled heat exchangers.

FIG. 10 is a section view of the tender 110 from the top. Hatched areas represent cooling airflow 113, as it is collected from the full face of the front of the tender, flows into cooling air flow path 111 on each side of the tender, which runs then entire length of the tender car. As the cooling airflow 113 travels along cooling air flow path 111 it is converged to a narrow section as it passes by the equipment room area 115, and then diverges again and slows down as it passes through air cooled heat exchanger 114. At some point along cooling air flow path 111, an optional air filter, or filters, can be installed to minimize the impact of air cooled heat exchanger 114 fouling. After flowing through air cooled heat exchanger 114 the now warmed air converges again as it flows around the equipment room area 115 at the opposite end of the tender 110 and then diverges and exits the tender.

Figure 11:
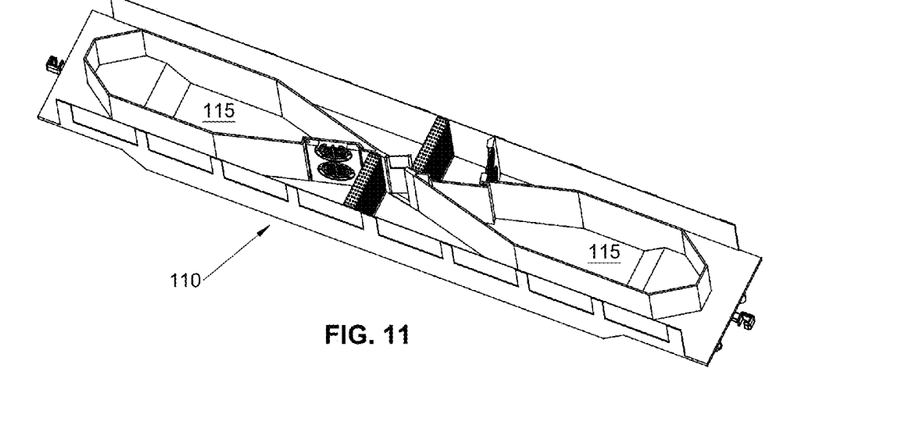
FIG. 11 is the same section view of FIG. 10 shown as an isometric view illustrating the air cooled heat exchanger component locations in the tender car relative to the equipment rooms at each end of the tender car.

FIG. 11 is an isometric view of the section from FIG. 10 which clearly illustrates the relationship of the equipment room areas 115 to the rest of the tender 110.

The equipment room areas 115 may include any one or more of the following elements and any combination thereof:

lines to and from the locomotive carrying engine cooling fluids (e.g., HRT coolant feed 44, HRT coolant return 45, LRT coolant feed 46 and LRT coolant return 47);

a line from the locomotive carrying exhaust gas (e.g., flexible exhaust conduit 40);

power electrical lines to and from the locomotive (e.g., locomotive DC bus 22 and tender DC bus 25);

a waste heat recovery system (e.g., WHRS 26);

an exhaust after treatment system (e.g., EAT 28);

one or more tanks for storing one or more fuels and/or liquids and/or gases required by an exhaust after treatment system (e.g., tender-mounted fuel tank 32);

dynamic breaking electronics and heater grids and/or energy storage devices (e.g., electrical energy storage system 24);

a traction motor controller (e.g., traction motors 21); and controls and/or sensors.

Figure 12:
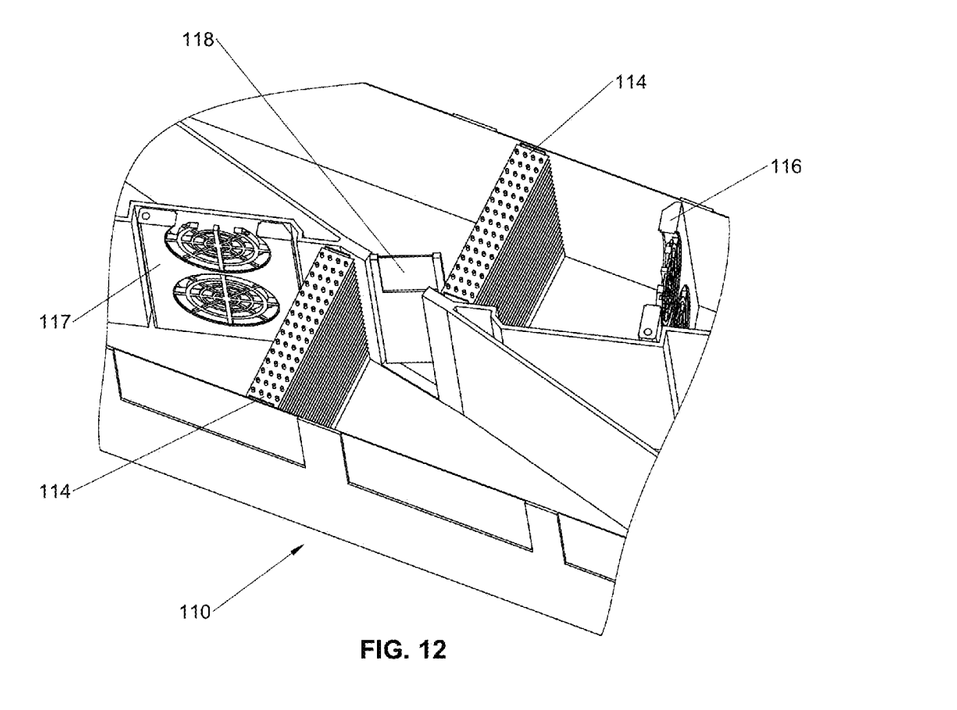
FIG. 12 is a zoomed in view of FIG. 11 This further clarifies the air cooled heat exchanger components in detail.

FIG. 12 is an expanded detail view of FIG. 11. It further illustrates the cooling system components. Air cooled heat exchangers 114 can be used as condensers for cooling the working fluid in the WHRS 26. Both air cooled heat exchangers 114 could be combined to service either one large WHRS 26 or as a unit they could be shared between two independent WHRS's 26. For additional redundancy, one air cooled heat exchanger 114 could service an independent WHRS 26 to support a single locomotive at one end of the tender 110 and the other air cooled heat exchanger 114 could service a second WHRS 26 to service a locomotive at the other end of the tender 110. Fan modules 116 and 117 illustrate how the air cooled heat exchangers 114 would be cooled when the tender 110 is not traveling fast enough to force enough ram air through the air cooled heat exchangers 114. Fan module 116 is shown in the passage where is could push air across the air cooled heat exchanger 114 as needed. Fan module 117 illustrates an optional fan module construction to retract fan module 117 out of the air flow path when not being required to push air at low speeds. It is retracted by rotating the assembly out of the flow path, typically into an appropriately sized cavity in the wall. Optionally retracting the fan module would decrease the pressure drop in the cooling air flow path and add to the total heat load that the air cooled heat exchanger 114 could dissipate using only ram air. Door 118 allows passage through the air cooled heat exchangers 114 from one end of the tender 110 to the other without having to disembark from the tender 110. The tender 110 is designed such that it can travel in either direction. When switching travel direction, the direction of rotation of the fans of the fan modules 116 and 117 are also reversed.

Figure 13:
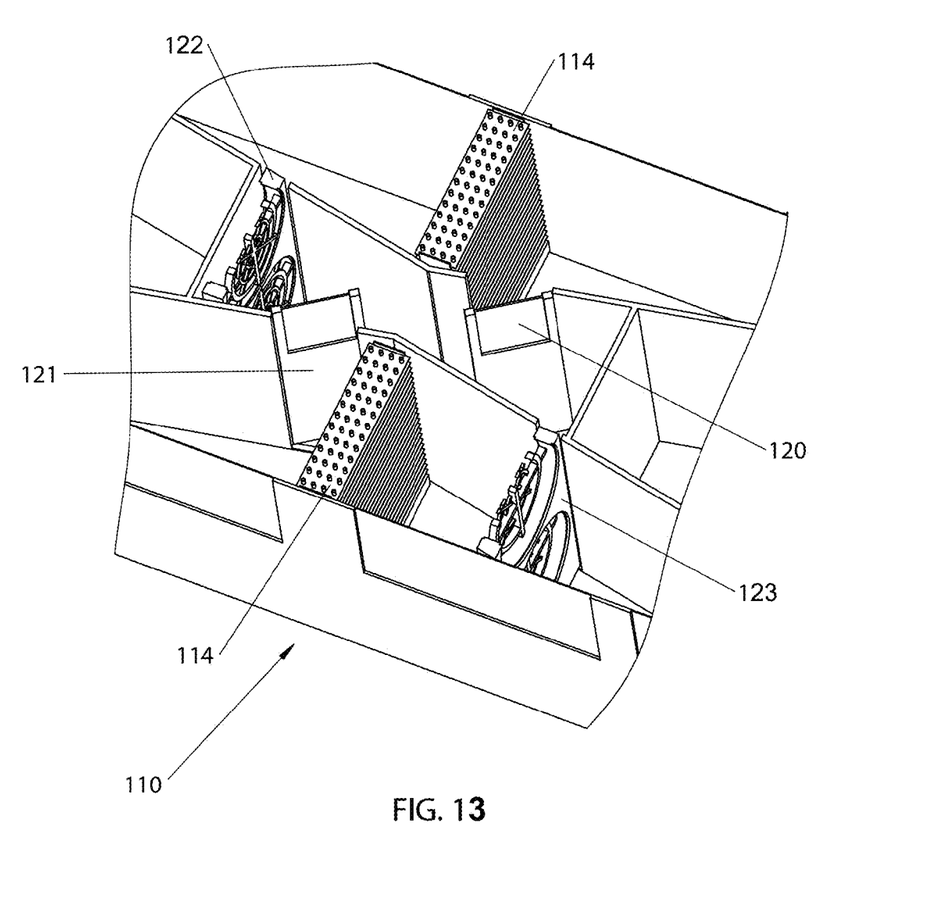
FIG. 13 is the same zoomed in view as FIG. 12, but illustrates a symmetrical construction of the tender with smaller air cooled heat exchangers.

FIG. 13 is the same view as FIG. 12 but illustrates a version of the tender 110 that is symmetric in construction. Tender 110 houses two air cooled heat exchangers 114 which are smaller and positioned opposite of each other. Fan modules 122 and 123 are used for cooling at low speeds. Fan module 123 is shown in an optional retracted configuration. In this embodiment fan modules 122 and 123 would slide into a pocket instead of rotating as in FIG. 12. Optionally, two doors 120 and 121 would be used to pass between the air cooled heat exchangers from one end of tender 110 to the other without having to disembark the tender 110. It should be noticed that either sliding fan modules 116 and 117 or rotating fan modules 122 and 123 could be used with either the asymmetric air cooled heat exchanger layout of FIG. 12 or the symmetric air cooled heat exchanger layout of FIG. 13.

The symmetric layout of FIG. 13 offers the possibility of a shorter tender 110 and some ease of construction benefits; and could be used if the smaller air cooled heat exchangers 114 can provide sufficient cooling capacity. The asymmetric layout of FIG. 12 allows for larger air cooled heat exchangers 114 to be used. If the pass-through door is deemed a non-critical feature by the tender's end-user, it may be eliminated from the design, resulting in a tender 119 with larger air cooled heat exchangers 114 used symmetrically.

While certain representative embodiments and details have been shown for purposes of illustrating the disclosure, it will be apparent to those skilled in the art that various changes may be made without departing from the scope of the disclosure, which is further described in the following appended claims.

I claim:

1. A railcar tender comprising:
    at least one inlet on a front face of the railcar tender;
    at least two air flow paths extending along the entire length of the railcar tender from the at least one inlet on the front face to a rear face of the railcar tender, wherein the front face and rear face are at opposites ends of the railcar tender along the direction of travel of the railcar tender;
    at least one equipment area between the two air flow paths; and
    at least one air cooled heat exchanger in communication each air flow path,
    wherein a cross-sectional area of each air flow path decreases as it extends along the equipment area and increases as it approaches the air cooled heat exchanger.

2. The railcar tender of claim 1 wherein the cross-sectional area of the air flow paths is greater as the air flow paths approach the air cooled heat exchanger, than the area of the cross sections as the air flow paths extend along the equipment area.

3. The railcar tender of claim 1 wherein the railcar tender comprises a first equipment area and a second equipment area, and wherein the cross-sectional area of each air flow path increases as it extends from the inlet, decreases as it extends along the first equipment area, increases as it approaches the air cooled heat exchanger, decreases as it extends along the second equipment area, and increases as it approaches the second face of the railcar tender.

4. The railcar tender of claim 1 further comprising a reversible fan within each air flow path, wherein each of the reversible fans are adapted to force air along the respective air flow path in either direction.

5. The railcar tender of claim 1 wherein the rear face includes at least one inlet, wherein the at least two air flow paths extend from the at least one inlet on the rear face to the front face of the railcar tender.

6. The railcar tender of claim 1 wherein the air-cooled heat exchangers are adapted to receive heat from an internal combustion engine in a locomotive.

7. The railcar tender of claim 1 wherein the equipment room includes a line from a locomotive carrying exhaust gas.

8. The railcar tender of claim 1 wherein the equipment room includes a waste heat recovery system.

9. The railcar tender of claim 1 wherein the equipment room includes an exhaust after treatment system.

10. The railcar tender of claim 1 wherein the equipment room includes at least one tank for storing one or more liquids.

11. The railcar tender of claim 1 wherein the equipment room includes a natural gas fuel storage tank adapted to supply natural gas to the locomotive.

12. The railcar tender of claim 1 further including a door and doorway connecting the two air flow paths through which a person can walk from a first air flow path to a second air flow path when the door is open and separating the two air flow paths when the door is closed.

* * * * *